United States Patent
Cvijetic et al.

(10) Patent No.: US 9,002,204 B2
(45) Date of Patent: Apr. 7, 2015

(54) 1 TB/S CONVERGED OPTICAL METRO-ACCESS TRANSMISSION BASED ON WAVELENGTH DIVISION MULTIPLEXED ORTHOGONAL FREQUENCY DIVISION MULTIPLE ACCESS PASSIVE OPTICAL NETWORK (WDM-OFDMA-PON)

(75) Inventors: Neda Cvijetic, Princeton, NJ (US); Milorad Cvijetic, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 592 days.

(21) Appl. No.: 13/270,206

(22) Filed: Oct. 10, 2011

(65) Prior Publication Data
US 2012/0269515 A1    Oct. 25, 2012

Related U.S. Application Data

(60) Provisional application No. 61/412,979, filed on Nov. 12, 2010.

(51) Int. Cl.
H04J 14/02    (2006.01)
H04B 10/548    (2013.01)
H04B 10/2507    (2013.01)
H04B 10/61    (2013.01)

(52) U.S. Cl.
CPC .......... H04B 10/548 (2013.01); H04J 14/0298 (2013.01); H04B 10/2507 (2013.01); H04B 10/61 (2013.01); H04J 14/0246 (2013.01); H04J 14/025 (2013.01); H04J 14/0265 (2013.01); H04J 14/0282 (2013.01)

(58) Field of Classification Search
CPC .............. H04B 10/02507; H04B 10/61; H04J 14/0246; H04J 14/025; H04J 14/0298; H04J 14/0282; H04J 14/0265
See application file for complete search history.

(56) References Cited

U.S. PATENT DOCUMENTS

| | | | |
|---|---|---|---|
| 2008/0267630 A1* | 10/2008 | Qian et al. | 398/89 |
| 2009/0010649 A1* | 1/2009 | Zuhdi et al. | 398/59 |
| 2009/0185804 A1* | 7/2009 | Kai et al. | 398/48 |
| 2009/0274462 A1* | 11/2009 | Yu | 398/68 |
| 2010/0215368 A1* | 8/2010 | Qian et al. | 398/67 |

OTHER PUBLICATIONS

R. P. Davey et al, "Long reach passive optical networks," IEEE Jnl. Lightwave Technol., vol. 27, No. 3, Feb. 2009.
H. Rohde, S. Smolorz, E. Gottwald, K. Kloppe, "Next generation optical access: 1 Gbit/s for everyone," Proc. IEEE ECOC 2009, paper 10.5.5, Sep. 2009.

(Continued)

Primary Examiner — Leslie Pascal
(74) Attorney, Agent, or Firm — Joseph Kolodka

(57) ABSTRACT

A Wavelength Division Multiplexed Orthogonal Frequency Division Multiple Access Passive Optical Network (WDM-OFDMA-PON) includes a passive last-mile optical split terminated by optical network units (ONUs) with OFDMA transceivers; a standard single mode fiber (SSMF) link; a central office optical line terminal (CO-OLT) coupled to SSMF link and the passive last-mile optical split, wherein the CO-OLT comprises an OFDMA transceiver, burst-mode-free operation, inline optical dispersion compensation free operation, and WDM-enabled operation.

21 Claims, 4 Drawing Sheets

(56) References Cited

OTHER PUBLICATIONS

C. Antony et al, "Demonstration of a carrier-distributed, 8192-split hybrid DWDM-TDMA PON over 124km field-installed fibers," Proc. IEEE/OSA Optical Fiber Conference (OFC) 2010, PDPD8.

D. Qian, N. Cvijetic, J. Hu, T. Wang, "108 Gb/s OFDMA-PON With Polarization Multiplexing and Direct Detection," IEEE Jnl. Lightwave Technol., vol. 28, No. 4, Feb. 2010.

D. Qian, N. Cvijetic, J. Hu and T. Wang, "A Novel Source-Free Architecture for Upstream OFDMA-PON Transmission," IEEE Phot. Technol. Lett., vol. 21, No. 17, Sep. 2009.

* cited by examiner

1 TB/S CONVERGED OPTICAL METRO-ACCESS TRANSMISSION BASED ON WAVELENGTH DIVISION MULTIPLEXED ORTHOGONAL FREQUENCY DIVISION MULTIPLE ACCESS PASSIVE OPTICAL NETWORK (WDM-OFDMA-PON)

This application claims priority to Provisional Application Ser. No. 61/412,979, filed Nov. 12, 2010, the content of which is incorporated by reference.

BACKGROUND

The present invention relates to an Optical Metro-Access Transmission Based on Wavelength Division Multiplexed Orthogonal Frequency Division Multiple Access Passive Optical Network (WDM-OFDMA-PON).

Next-generation passive optical networks (PON), with 40+ Gb/s target data rates and aggressive power budgets that can accommodate both increased PON reach and higher optical network unit (ONU) split ratios, have become a highly prominent topic in optical access research and commercialization activities. Moreover, it is important to ensure PON cost-efficiency, such it is highly desirable to maximally reuse deployed legacy fiber with last-mile passive optical splitters, which account for 70-80% of PON investment costs. Finally, to lower PON operational costs and power consumption, a dramatic reduction in the number of central office (CO) sites in the access network is needed. Under such a scenario, many COs servicing shorter-reach, lower split ratio PONs would be merged into a single CO that would service a long-reach (100+ m), large split ratio (1000+) PON, with up to 1 Gb/s peak symmetric downstream/upstream data rates per user. Such a high-performance, long-reach PON would essentially converge the hereto separate metro and access optical networks into a single high-speed platform.

A promising approach for such metro-access convergence with a passive last-mile split is a hybrid network based on dense wavelength division multiplexing (DWDM) combined with a colorless last-mile multiple access technology, such as time division multiple access (TDMA), for example. However, in TDMA-based last-mile approaches, the per-wavelength (i.e. per $\lambda$) speed is limited to 10 Gb/s/$\lambda$, and the aggregate speed to 32$\lambda$×10 Gb/s/$\lambda$=320 Gb/s, due to the requirement for high-speed upstream burst-mode operation. Moreover, both inline optical dispersion compensation and time-domain electronic equalization were required to mitigate the chromatic dispersion (CD)-induced power budget penalty. With experimentally demonstrated per-wavelength data rates of 40-108 Gb/s/$\lambda$, digital signal processing (DSP)-based Orthogonal Frequency Division Multiple Access (OFDMA)-PON has emerged as an attractive candidate for next-generation optical access. Next to record per-channel speeds, OFDMA-PON advantages include a passive last-mile split, very high CD tolerance, as well as burst-mode-free upstream operation via dynamic frequency-domain bandwidth allocation. From this perspective, OFDMA-PON is a highly-promising technology to realize high-speed network convergence.

FIG. 1 shows a conventional WDM-converged metro/access network with a WDM-PON last mile. At the central office optical line terminal (CO-OLT), the output signals of a 32$\lambda$×1.25 Gb/s/$\lambda$ transmitter array (100) operating on DS wavelengths $\lambda_{1,\,DS}$ to $\lambda_{32,\,DS}$ is combined with an arrayed waveguide grating (AWG) in (200) and aligned onto a 50 GHz ITU-T grid for downstream transmission over standard single mode fiber (SSMF) in (203). A practical choice of the ITU-T grid can be the 1529-1541.6 nm portion of the C-band, for example. The modulated dense WDM (DWDM) signal is transmitted over the metro network (203), which consists of D km of standard single mode fiber (SSMF). In the access network, a second AWG (301) is used to de-multiplex the aggregate signal into 32 separate 1.25 Gb/s signals, which pass through a diplexer (304), d km of SSMF (305), and a second diplexer (401) in point-to-point fashion to reach one of the 32 optical network units (ONUs). At each ONU, the DS signal on $\lambda_{1,\,DS}$ is received in the ONU receiver (402). For upstream 32$\lambda$×1.25 Gb/s/$\lambda$ transmission, a 1.25 Gb/s ONU transmitter (500) is used, which is made up of a reflective electroabsorption modulator (R-EAM) and semiconductor optical amplifier (SOA), known in prior art. The ONU transmitter (500) in each of the 32 ONUs locks onto and modulates a dedicated upstream wavelength, $\lambda_{1,\,US}$ to $\lambda_{32,\,US}$. The modulated upstream signal $\lambda_{i,US,mod}$ is then routed through (401), (305), and (304), in that order, to the second AWG (600), where the aggregate upstream signal is launched over the metro network SSMF (602) to the CO-OLT. At the CO-OLT, the incoming wavelengths are de-multiplexed in an AWG (701) and processed individually by the 1.25 Gb/s CO-OLT receiver array (800). The advantages of the conventional WDM-PON approach of FIG. 1 includes the use of cost-efficient 1.25 Gb/s optical components, the low insertion loss of the AWG compared to the last-mile passive optical splitter, and physical layer security. However, the approach of FIG. 1 would also require fundamental network alteration (i.e. the removal of all deployed passive splitters and replacement with AWGs), which would entail enormous additional cost to network operators. Moreover, the per-user peak bandwidth is limited to 1.25 Gb/s, without the ability to statistically multiplex multi-user traffic. Finally, the speed of this architecture is limited to 32$\lambda$×1.25 Gb/s/$\lambda$=40 Gb/s, with only 32 users (ONUs) accommodated per fiber.

FIG. 2 shows a variation of the WDM-PON of FIG. 1, which features similar operation as the conventional WDM-PON of FIG. 1, except that it removes the requirement for an AWG in the last mile network, such that the deployed passive optical splitter (400) can be re-used. This is achieved in FIG. 2 by equipping the CO-OLT with an array of broadband transmitters (100) and receivers (800), and the ONUs with an optical coherent receiver (402) featuring a tunable laser that can lock onto the upstream wavelength $\lambda_{i,\,US}$ based on the downstream wavelength reference $\lambda_{i,\,DS}$ that is pre-assigned to it at the CO-OLT. This tuning and locking feature is known from prior art. In this way, colorless WDM operation is achieved without the need for reflective ONU-side optical devices or a last-mile AWG split, and the coherent receiver (402) can enable receiver 3+ dB sensitivity gains compared to equivalent non-coherent detection. However, due to the use of 1 GHz optical components for cost-efficiency, the peak data rate is still limited as above without the possibility for statistical multiplexing of user bandwidth. Moreover, since low-cost tunable lasers are not yet commercially available, the cost-efficiency of coherent ONU receiver (402) is questionable.

FIG. 3 shows a conventional WDM-converged metro/access network with a TDMA-PON last mile. At the CO-OLT, the output signals of a 32$\lambda$×10 Gb/s/$\lambda$ transmitter array (100) operating on DS wavelengths $\lambda_{1,\,DS}$ to $\lambda_{32,\,DS}$ is combined with an AWG (200) and aligned onto a 50 GHz ITU-T grid. Next, dispersion compensating fiber (DCF) in (202) is used to mitigate the chromatic dispersion effect, which is followed by downstream SSMF transmission (203). At the local exchange (LE), optical amplification (OA) and DWDM de-multiplexing are performed in (204) and (301), respectively, with each 10 Gb/s/λ downstream signal distributed to N users by a diplexer (304), SSMF (305), and a passive optical splitter (400). After a second diplexer (401), the downstream signal is received in (402) by a 10 GHz photodiode. Due to TDMA, bandwidth usage can be apportioned in a time-domain round-robin fashion among multiple ONUs, such that during each time slot, only one ONU can transmit or receive. Consequently, the peak data rate of 10 Gb/s is statistically shared between N users, where N can vary from 32 to 256. For upstream transmission, ONU-side R-EAM-SOAs (described in prior art) in the ONU transmitter (500) are used to modulate upstream data at each ONU, such that a 10 Gb/s aggregate TDMA upstream signal from N ONUs, $\lambda_{i,US,mod}$, occupies one of 32 upstream wavelengths. Following (401), (400), (305), and (304), in that order, the upstream signals from multiple wavelengths are aggregated by the upstream LE AWG (600), optically amplified (601), and launched over the metro SSMF (602). The upstream wavelengths are de-multiplexed at the CO-OLT AWG (701), and the 10 Gb/s signal from each $\lambda_{i,US}$ is received by a high-speed 10 Gb/s burst-mode receiver (800). The main advantages of the WDM-TDMA-PON approach are the re-use of last-mile passive splitter (400), and the ability to accommodate up to 32×256=8192 users (ONUs) per fiber. However, in TDMA-based last-mile approaches, the per-wavelength (i.e. per λ) speed is limited to 10 Gb/s/λ, and the aggregate speed to 32λ×10 Gb/s/λ=320 Gb/s, due to the requirement for 10 Gb/s upstream burst-mode operation (800), which cannot readily scale to a 40 Gb/s/λ line rate. Moreover, due to the 10 Gb/s line rate, both inline optical dispersion compensation (202) and time-domain electronic equalization following (800) are required to mitigate the chromatic dispersion power budget penalty.

SUMMARY

In one aspect, A Wavelength Division Multiplexed Orthogonal Frequency Division Multiple Access Passive Optical Network (WDM-OFDMA-PON) includes a passive last-mile optical split terminated by optical network units (ONUs) with OFDMA transceivers; a standard single mode fiber (SSMF) link; a central office optical line terminal (CO-OLT) coupled to SSMF link and the passive last-mile optical split, wherein the CO-OLT comprises an OFDMA transceiver, burst-mode-free operation, inline optical dispersion compensation free operation, and WDM-enabled operation.

In one implementation, a record 32λ×40 Gb/s/λ=1.28 Tb/s converged DWDM-OFDMA-PON metro-access network features a passive last-mile optical split, no inline optical dispersion compensation, burst-mode-free operation, and uses only off-the-shelf 10 GHz ONU-side optical components. With OFDMA-based statistical multiplexing, the system can deliver 1 Gb/s per ONU to 1000+ users, while also facilitating network convergence. Moreover, by cost-efficiently enabling record rate-transmission products with high subscriber density, the system can be viewed as highly attractive for next-generation metro-access networks.

Advantages of the preferred embodiments may include one or more of the following. WDM-OFDMA-PON converged metro/access architecture that increases the per-channel data rate via multi-level electronic modulation to 40 Gb/s/λ while re-using cost-efficient 10 GHz optical components, maintaining the passive last-mile optical split, and eliminating the need for optical dispersion compensation. In the upstream direction, moreover, one exemplary embodiment architecture exploits OFDMA and coherent detection at the CO-OLT to enable statistical bandwidth multiplexing through digital signal processing (DSP) with peak data rates of up to 40 Gb/s per user, without the need for a high-speed burst-mode receiver array at the CO-OLT. One exemplary embodiment scheme thus achieves record 32λ×40 Gb/s/λ=1.28 Tb/s aggregate speed over 100+ m distances for 1000+ users with split ratios N≥32. The preferred embodiment increases the maximum achievable aggregate data rate of converged metro/access systems to 1.28 Tb/s over 100+ km distances, while re-using cost-efficient 10 GHz optical components and removing the need for optical dispersion compensation. With OFDMA-based statistical multiplexing, such an architecture can deliver 1 Gb/s per ONU to 1000+ users, while also facilitating network convergence. The solution moreover re-uses the passive optical splitter, enables dynamic statistical bandwidth multiplexing through DSP, enables peak data rates of up to 40 Gb/s per user, and does not require burst-mode upstream receiver operation. By cost-efficiently enabling record rate-transmission products with high subscriber density, one exemplary embodiment approach can be viewed as highly attractive for next-generation metro-access networks.

DESCRIPTION

Figure 1:
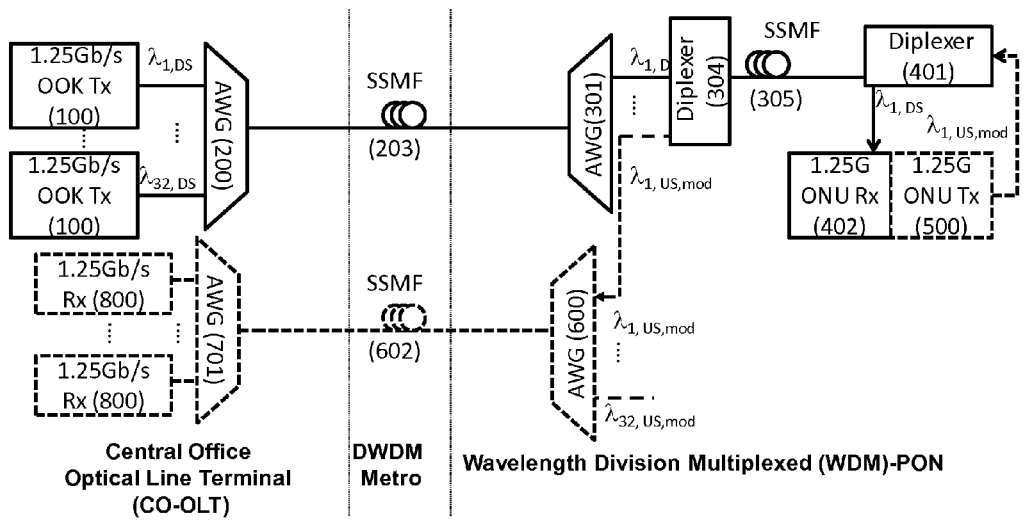
FIG. 1 shows a conventional converged metro/access architecture based on WDM-PON.
Figure 2:
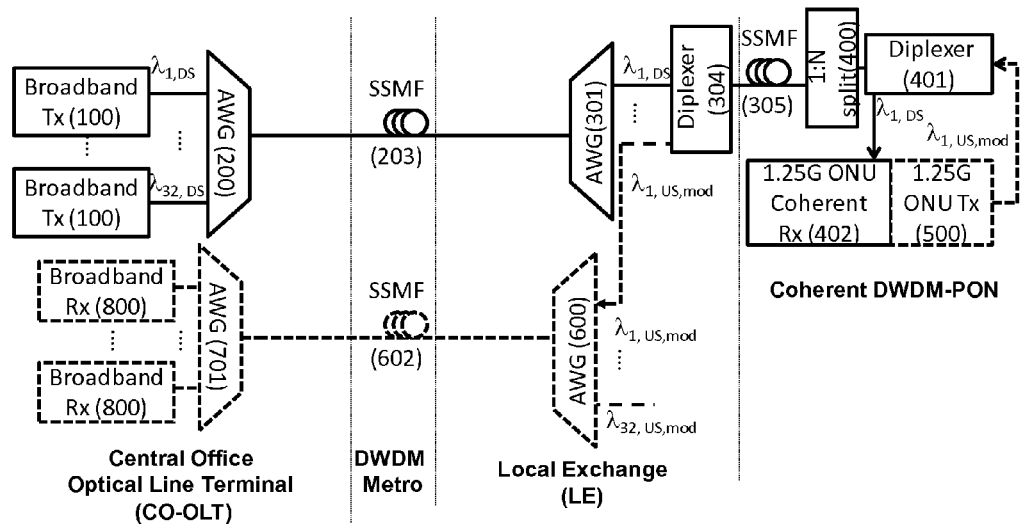
FIG. 2 shows a conventional converged metro/access architecture based on DWDM-PON with coherent ONUs.
Figure 3:
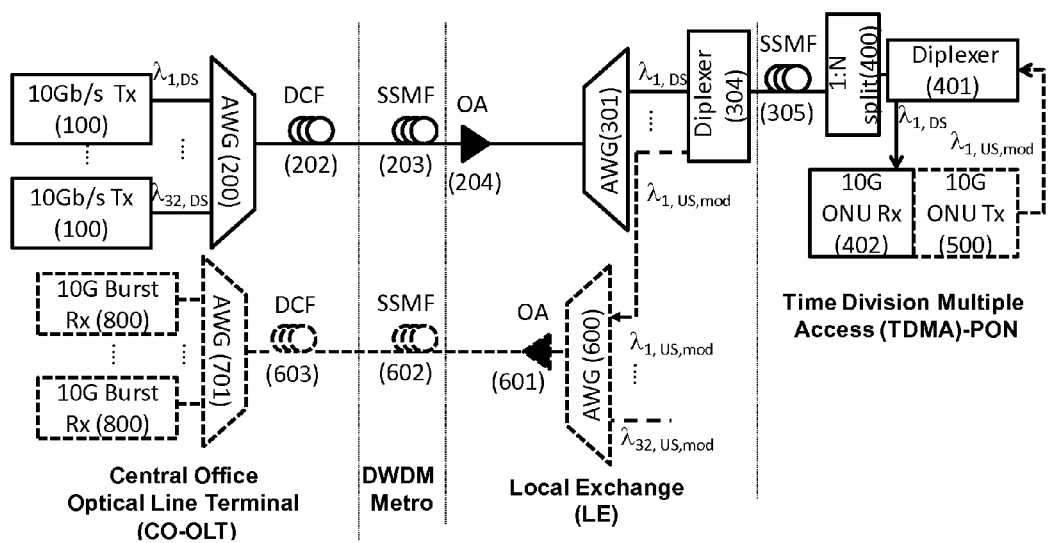
FIG. 3 shows a conventional converged metro/access architecture based on TDMA-PON.
Figure 4:
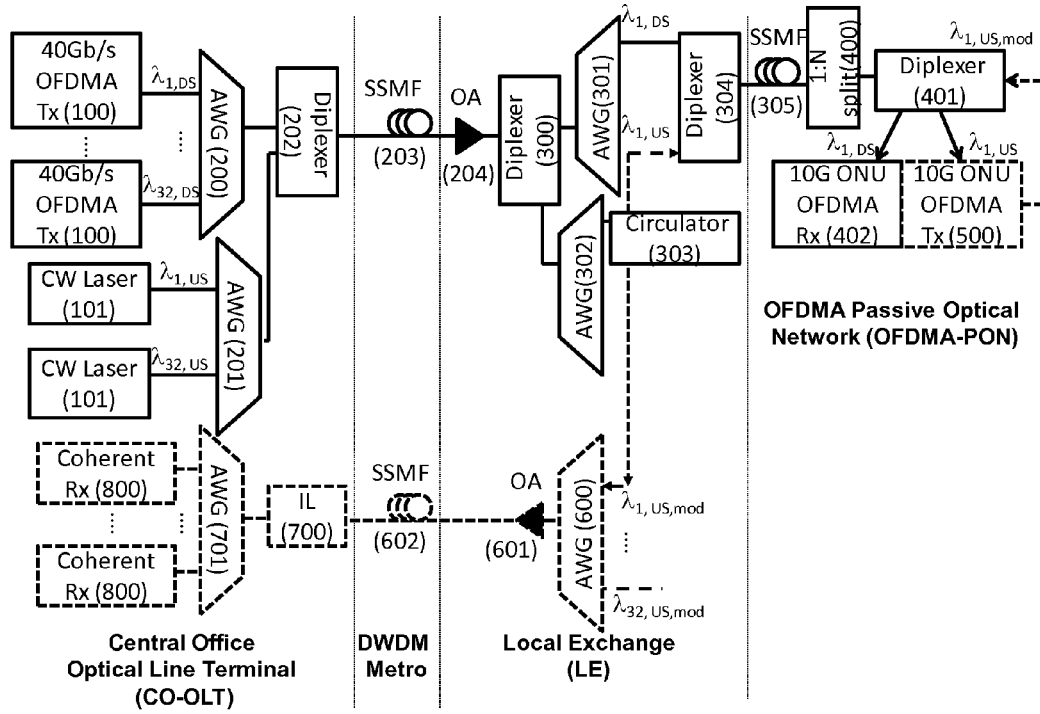
FIG. 4 show one exemplary embodiment of a 1.28 Tb/s converged metro/access WDM-OFDMA-PON.

FIG. 4 illustrates one exemplary 1.28 Tb/s DWDM-OFDMA-PON architecture for converged metro-access transmission. In this implementation, at the CO optical line terminal (CO-OLT), the output signals of 32 40 Gb/s OFDM transmitters (100) operating on DS wavelengths $\lambda_{1,DS}$ to $\lambda_{32,DS}$ are combined with an AWG (200) and can be aligned onto a 50 GHz ITU-T grid in the 1529-1541.6 nm portion of the C-band. Other channel spacings (e.g. 100 GHz) and spectral placements (e.g. L-band) can also be chosen without loss of generality. The OFDM transmitters exploit multi-level quadrature amplitude modulation (QAM), optical single sideband (OSSB) transmission, and/or polarization multiplexing (POLMUX), as described in prior art, such the 40 Gb/s OFDM signals occupy a bandwidth <10 GHz. Moreover, the OFDM transmitter may generate a 40 Gb/s signal in the form of one OFDMA band or several OFDMA sub-bands, without loss of generality. A second array of continuous wave (CW) signals from 32 lasers (101) with upstream wavelengths $\lambda_{1,US}$ to $\lambda_{32,US}$ is generated by a second 50 GHz channel-spaced AWG (201), with a 10 nm guard window separating the DS and US bands. The modulated DS wavelengths and un-modulated US carriers are aggregated with a diplexer (202) and transmitted over D km of SSMF (203), to a local exchange (LE), where the incoming signal is optically amplified (204) and routed via a diplexer (300), AWGs (301) and (302), and diplexer (304) into DS/US wavelength pairs, $\lambda_{i,DS}/\lambda_{i,US}$, i=1, 2, ..., 32, for distribution to the OFDMA- PONs. Following transmission over an additional d km of SSMF (305) and a 1:N passive optical split (400), the DS and US wavelengths are separated by a diplexer (401) in each ONU, such that the 32 40 Gb/s DS OFDMA signals on $\lambda_{i,DS}$ are demodulated and processed in the ONU 10 G receivers (402). Depending on whether single-polarization or POL-MUX OFDMA modulation is used in (100), the ONU receiver (402) will feature either one 10 GHz photodiode, or two 10 GHz photodiodes preceded by a polarization beam splitter, as known in the art. Upstream data mapped on pre-assigned OFDM subcarriers is used to intensity-modulate the distributed US carriers on $\lambda_{i,US}$ in each ONU upstream transmitter (500). Using multi-level modulation, such as 16-QAM, a 10 GHz IM can be used, such that each ONU needs only 10 GHz components for 40 Gb/s operation. The modulated upstream signal from each ONU is passed back to the diplexer (401). Next, N such upstream ONU signals on each $\lambda_{i,US,mod}$ are passively combined in (400), transmitted over SSMF (305), passed through the diplexer (304), and then through a circulator (303) to the upstream AWG (600). At the AWG (600), signals from all 32 upstream wavelengths are combined (600), optically amplified (601), and transmitted back to the CO-OLT over D km of SSMF (602). At the CO-OLT, an optical interleaver (IL) in (700) is used to remove the optical carriers of the 32×40 Gb/s upstream DWDM-OFDMA signal to prevent post-photodetection broadband beating noise. The DWDM signal is then de-multiplexed by AWG (701) and received by a bank of 32 coherent optical receivers (800). The aggregate speed of one exemplary embodiment DWDM-OFDMA-PON architecture is thus a record symmetric 32×40 Gb/s=1.28 Tb/s. Moreover, the architecture of FIG. 4 requires neither complex high-speed burst mode receivers, nor optical dispersion compensation, and features exclusively 10 GHz ONU optical components, greatly enhancing cost-efficiency.

Figure 5:
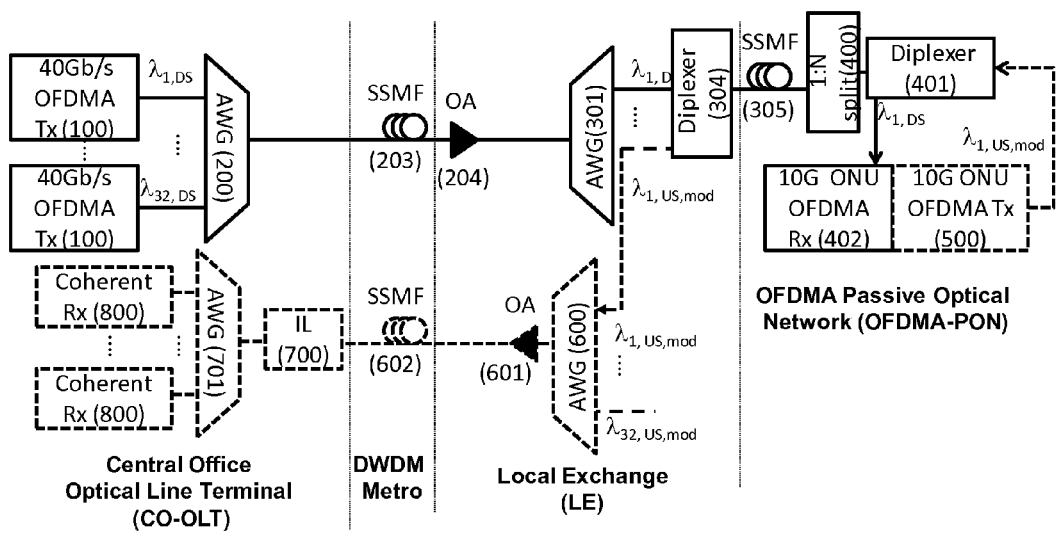
FIG. 5 shows a second embodiment of a 1.28 Tb/s converged metro/access WDM-OFDMA-PON.

FIG. 5 shows a second embodiment of a 1.28 Tb/s converged metro/access WDM-OFDMA-PON. Downstream (DS) and upstream (US) sub-architectures are denoted by solid and dashed lines, respectively. The operation of this architecture is similar to the architecture of FIG. 4, except that in this case, the upstream laser sources are not distributed from the CO-OLT to the ONUs, as was the case with (101) in FIG. 4. Instead, the laser sources for upstream transmission are located in the ONU transmitter (500), either in the form of a R-EAM-SOA, or a tunable laser combined with an external intensity modulator. The relocation of the laser sources reduces the number of AWGs and diplexers need to enable downstream operation. However, it can increase the cost of the ONU side hardware.

Figure 6:
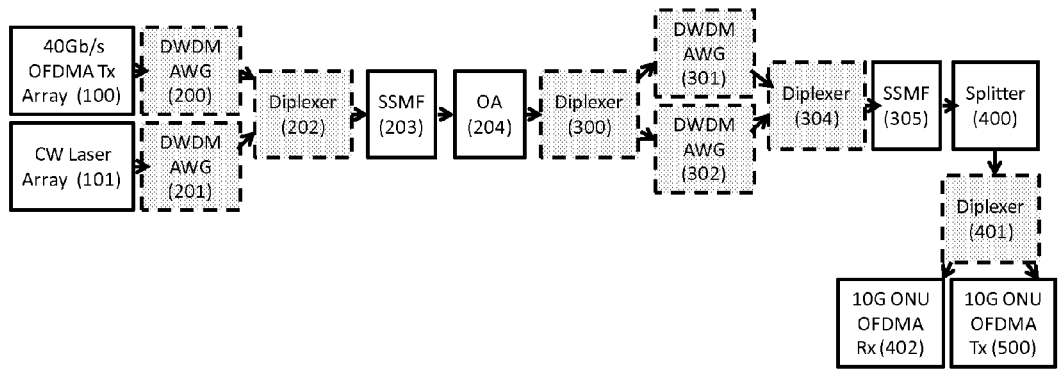
FIG. 6 shows one exemplary downstream portion of a 1.28 Tb/s WDM-OFDMA-PON architecture.

FIG. 6 illustrates one exemplary downstream portion of the 1.28 Tb/s WDM-OFDMA-PON architecture. The system (record speed 1.28 Tb/s transmission) is enabled by the lower level features denoted by the shaded, dashed rectangles. For the embodiment of FIG. 6, the lower level inventive features include the above shown arrangement of DWDM AWGs (200) and (201), the diplexers (202) and (300), DWDM AWGs (301) and (302) and diplexers (304) and (401). The above illustrated choice and concatenation of these devices to achieve record transmission speed is not known from prior art. For the downstream embodiment of FIG. 5, the claim tree diagram is very similar to the one of FIG. 6, except that features (101), (201), (202), (300), and (302) are removed.

Figure 7:
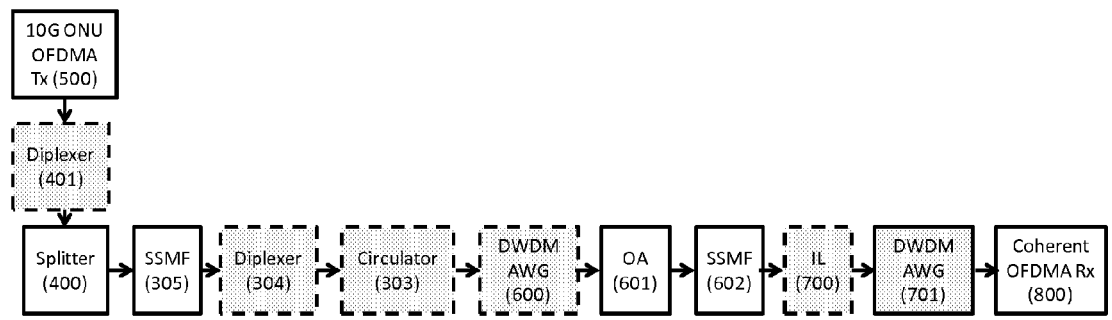
FIG. 7 shows one exemplary upstream portion of a 1.28 Tb/s WDM-OFDMA-PON architecture.

FIG. 7 illustrates one exemplary upstream portion of the 1.28 Tb/s WDM-OFDMA-PON architecture. The system (record speed 1.28 Tb/s transmission) is enabled by the lower level features denoted by the shaded, dashed rectangles. For the embodiment of FIG. 7, the lower level inventive features include the above shown arrangement of diplexers (401) and (304), optical circulator (303), DWDM AWG (600), optical interleaver (IL) (700) and the DWDM AWG (701). The above illustrated choice and concatenation of these devices to achieve record transmission speed is not known from prior art. For the upstream embodiment of FIG. 5, the diagram is very similar to the one of FIG. 7, except that feature (303) is removed.

The record 32λ×40 Gb/s/λ=1.28 Tb/s converged DWDM-OFDMA-PON metro-access network features a passive last-mile optical split, no inline optical dispersion compensation, burst-mode-free operation, and uses only 10 GHz ONU-side optical components. The 1.28 Tb/s downstream operation with a 140 km total SSMF reach and a N=64 split is feasible, enabling a total of 32×64=2048 users per fiber. The system requires neither complex high-speed burst mode receivers, nor optical dispersion compensation, and features exclusively 10 GHz ONU optical components, greatly enhancing cost-efficiency. Due to both optical amplification at the LE and coherent reception at the OLT, 100$^+$ km US transmission at 40 Gb/s is readily achievable; 36 Gb/s/$\lambda_{i,US}$ unamplified US transmission over 100 km SSMF has already been experimentally demonstrated. The 40 Gb/s DS operation can be achieved with direct ONU-side photodetection using 10 GHz components. By achieving record speed, longer reach and higher ONU counts per fiber, the network is very promising for future converged optical metro and access systems.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A Wavelength Division Multiplexed Orthogonal Frequency Division Multiple Access Passive Optical Network (WDM-OFDMA-PON), comprising:
   a central office optical line terminal (CO-OLT) comprising downstream OFDMA transmitters and continuous wave (CW) lasers and upstream coherent OFDMA receivers;
   a downstream path from the CO-OLT to optical network units (ONUs);
   an upstream path from said ONUs to the CO-OLT
   wherein the CO-OLT comprises one or more wavelength division multiplexing arrayed waveguide gratings (WDM AWGs) coupled to a diplexer and wherein the diplexer aggregates OFDMA and CW signals and transmitted over the downstream SSMF to a local exchange (LE), where downstream signals are optically amplified and routed with a second diplexer or second optical coupler, AWGs, and third diplexer or third optical coupler into downstream/upstream (DS/US) wavelength pairs for distribution to the OFDMA-PONS.

2. The network of claim 1, wherein the CO-OLT comprises burst-mode-free operation, optical inline dispersion compensation free operation, and WDM-enabled operation.

3. The network of claim 1, wherein the downstream path from the CO-OLT to the ONUs comprises a downstream SSMF and a bidirectional SSMF, wherein the bidirectional SSMF is terminated by a 1:N passive splitter.

4. The network of claim 3, wherein a first diplexer is coupled to the first end of the downstream SSMF and the second end of the downstream SSMF is terminated by a second diplexer.

5. The network of claim 4, comprising a third diplexer terminated by the first end of the bidirectional SSMF.

6. The network of claim 5, comprising an optical circulator coupled to a downstream AWG, the third diplexer, and an upstream AWG.

7. The network of claim 6, comprising a fourth diplexer or optical coupler positioned between an ONU and the 1:N passive optical splitter.

8. The network of claim 5, comprising
a fourth diplexer or optical coupler positioned between an ONU and the bidirectional SSMF;
the third diplexer or optical coupler coupled to the bidirectional SSMF;
a circulator coupled to the third diplexer;
a first upstream WDM AWG coupled to the circulator and to the first end of an upstream SSMF;
an optical interleaver coupled to the second end of the upstream SSMF;
a second upstream AWG coupled to the optical interleaver; and
coherent OFDMA receivers coupled to the second upstream AWG.

9. The network of claim 3, comprising a CO-OLT coupled to the downstream SSMF, including:
a. One or more WDM AWGs coupled to a first diplexer coupled to the first end of the first downstream SSMF;
b. One or more WDM AWGs coupled to a second diplexer where the second diplexer is coupled to the second end of the downstream SSMF.

10. The network of claim 1, wherein the ONUs comprise OFDMA transmitters and OFDMA receivers.

11. The network of claim 1, wherein the upstream path from the ONUs to the OLT comprises a bidirectional SSMF and an upstream SSMF.

12. The network of claim 11, wherein the first end of the upstream SSMF is coupled to a first upstream AWG and the second end of the upstream SSMF is terminated by an optical interleaver.

13. The network of claim 12, wherein the optical interleaver is coupled to a second upstream AWG.

14. The network of claim 13, comprising an array of coherent OFDMA receivers coupled to the second upstream AWG.

15. A Wavelength Division Multiplexed Orthogonal Frequency Division Multiple Access Passive Optical Network (WDM-OFDMA-PON), comprising:
a CO optical line terminal (CO-OLT), including
OFDMA transmitters coupled to an AWG and aligned onto a wavelength grid;
an array of continuous wave (CW) signals from lasers with upstream wavelengths combined by a channel-spaced AWG; and
a first diplexer or first optical coupler aggregating OFDMA and CW signals transmitted over a downstream SSMF to a local exchange (LE), where downstream signals are optically amplified and routed with a second diplexer or second optical coupler, AWGs, and third diplexer or third optical coupler into downstream/upstream (DS/US) wavelength pairs for distribution to the OFDMA-PONS.

16. The network of claim 15, comprising a bidirectional SSMF coupled to the third diplexer/optical coupler and a 1:N passive optical splitter.

17. The network of claim 16, wherein downstream (DS) and upstream (US) wavelengths are separated by a fourth diplexer/optical coupler in each ONU and wherein DS OFDMA signals are demodulated and processed by ONU OFDMA receivers.

18. The network of claim 16, wherein upstream data mapped on pre-assigned OFDMA subcarriers is used to intensity-modulate distributed upstream carriers in each ONU upstream OFDMA transmitter.

19. The network of claim 16, wherein upstream OFDMA signals from each ONU are passed back to a fourth diplexer/optical coupler and passively combined and transmitted over the bidirectional SSMF, passed through the third diplexer/optical coupler and a circulator to a first upstream AWG.

20. The network of claim 19, wherein the upstream wavelengths are combined using the first upstream AWG, optically amplified, and transmitted back to the CO-OLT over an upstream SSMF.

21. The network of claim 20, comprising an optical interleaver (IL) at the CO-OLT coupled to the second end of the upstream SSMF to remove the optical carriers and one optical sideband of the upstream WDM-OFDMA signal to prevent post-photodetection broadband beating noise and enable optical inline dispersion compensation free operation.

* * * * *